H. T. BATTIN.
SAFETY LOCK BOLT.
APPLICATION FILED AUG. 1, 1910.
986,539.
Patented Mar. 14, 1911.
Fig. 1
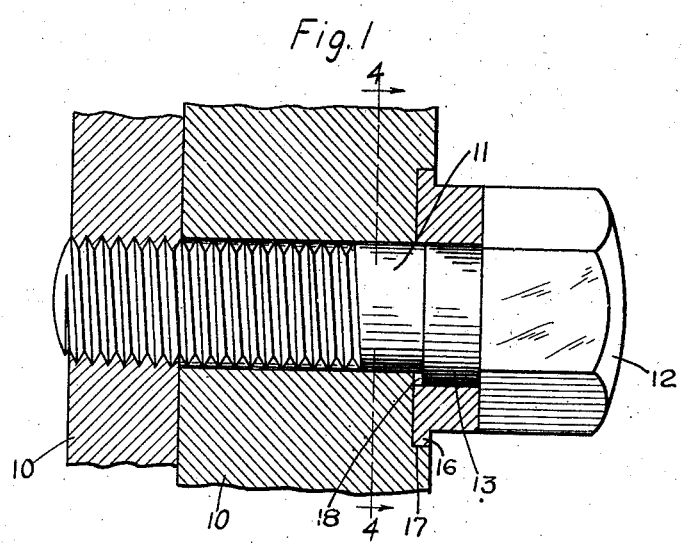
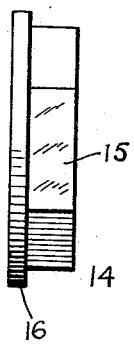
Fig. 2
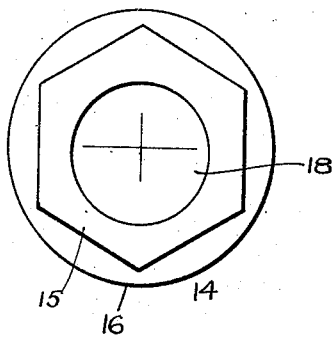
Fig. 3
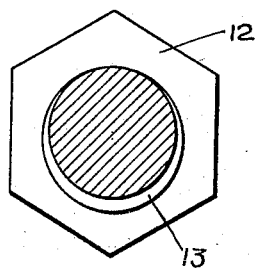
Fig. 4
WITNESSES:
H. W. Meade
U. L. Coates
INVENTOR
Harold T. Battin
BY
N. M. Wooster
ATTORNEY

UNITED STATES PATENT OFFICE.

HAROLD T. BATTIN, OF BRIDGEPORT, CONNECTICUT.

SAFETY LOCK-BOLT.

986,539.                    Specification of Letters Patent.    Patented Mar. 14, 1911.

Application filed August 1, 1910. Serial No. 574,959.

*To all whom it may concern:*

Be it known that I, HAROLD T. BATTIN, a citizen of the United States, residing at Bridgeport, county of Fairfield, State of Connecticut, have invented an Improvement in Safety Lock-Bolts, of which the following is a specification.

This invention has for its object to provide a simple and inexpensive safety lock bolt adapted for general use, as upon machinery, locomotives, cars, automobiles, etc., which shall dispense with the use of a nut and which by a slight additional operation after being turned to place may be effectually locked so that it cannot jar loose or cannot be turned out until a simple and quickly performed unlocking operation has been performed.

With this and other objects in view I have devised the novel safety lock bolt which I will now describe, referring to the accompanying drawing forming a part of this specification and using reference characters to indicate the several parts.

Figure 1 is a sectional view illustrating the operation of my novel lock bolt; Fig. 2 an edge view of the locking collar detached; Fig. 3 a plan view of the locking collar; and Fig. 4 is a section of the bolt looking toward the head, as upon the line indicated by 4—4 in Fig. 1, the work and locking collar being removed.

10 denotes work or pieces of metal secured together by the bolt, 11 the shank of the bolt and 12 the head which may be of any ordinary outline or configuration. Under the head and upon the shank of the bolt I provide an eccentric 13, the short radius of the eccentric being equal to the radius of the shank of the bolt and the long diameter being directly opposite thereto.

14 denotes a locking collar which comprises an angular portion 15 which corresponds in external configuration with the head of the bolt and a circular flange 16 which fits closely in a corresponding countersunk recess 17 in the face of the work. The locking collar is provided with a hole 18 through it of just sufficient size to receive the eccentric and placed eccentrically for this purpose.

The operation is as follows: In turning in the bolt the head and the angular portion of the locking collar are both engaged by a wrench and set up tight, the flange turning freely in the countersunk recess so long as the angular portion is retained in alinement with the head of the bolt. Having set the bolt up tight by turning the collar and bolt together, the wrench is then applied to the angular portion of the collar alone and the collar is given movement independently of the bolt, the effect of which is to cause the wall of the eccentric hole in the collar to engage the eccentric and to force one side of the periphery of flange 16 into binding engagement with the wall of recess 17 in the work, thus effectually locking the collar to the eccentric on the bolt and also effectually locking the bolt and the collar against rotation through the engagement of the flange of the collar with the wall of the recess in the work. This engagement is so strong that it is practically impossible to turn out the bolt by power applied to the head and it also effectually prevents the bolt from jarring loose as when in use in rail joints, locomotives, passenger and freight cars, automobiles, etc. To remove the bolt it is simply necessary to apply the wrench first to the angular portion of the collar and turn it into alinement with the bolt head after which the collar and the bolt may be turned out readily by applying the wrench to both collar and bolt head.

Having thus described my invention, I claim:

1. A lock bolt comprising a head and a shank and an eccentric on the shank under the head, and a locking collar having a flange adapted to engage a recess in the work, an angular portion corresponding with the head of the bolt and an eccentric hole through it adapted to receive the eccentric, whereby the bolt may be locked by turning the collar independently of the head.

2. A lock bolt comprising a head, a shank and an eccentric under the head, and a locking collar having an angular portion corresponding with the bolt head, a circular flange adapted to engage a recess in the work and an eccentric hole through it which receives the eccentric on the bolt, movement of the locking collar independently of the bolt acting to lock the collar to the eccentric and to lock the collar in the recess in the work.

3. A lock bolt comprising a shank, a head and an eccentric under the head, and a locking collar having a hole to receive the eccentric and a circular flange adapted to engage the wall of a corresponding recess in the work.

4. A lock bolt comprising a shank, a head and an eccentric under the head, and a locking collar having a hole to receive the eccentric, a circular flange adapted to engage a corresponding recess in the work and an angular portion corresponding with the head of the bolt.

In testimony whereof I affix my signature in presence of two witnesses.

HAROLD T. BATTIN.

Witnesses:
 RONALD C. HANDS,
 CLAIR O. EVANS.

Copies of this patent may be obtained for five cents each, by addressing the "Commissioner of Patents, Washington, D. C."